(No Model.)
B. F. PASCOE.
WAGON BRAKE.
No. 525,618.
Patented Sept. 4, 1894.
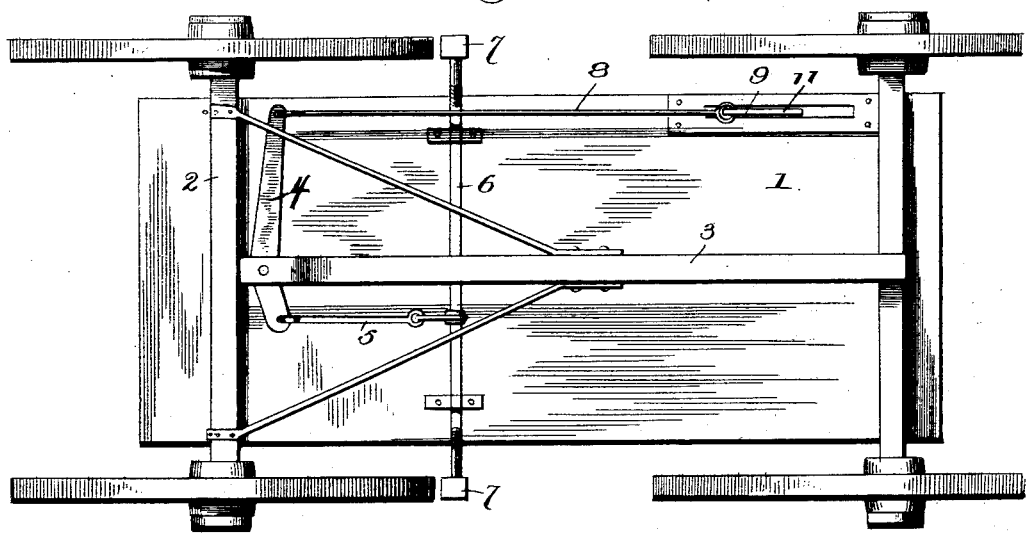
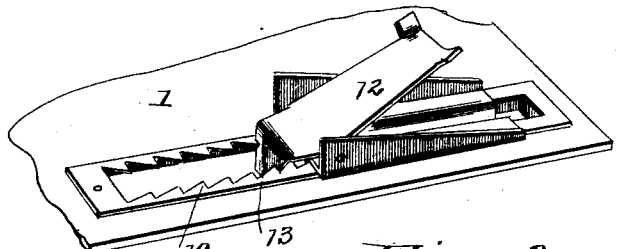
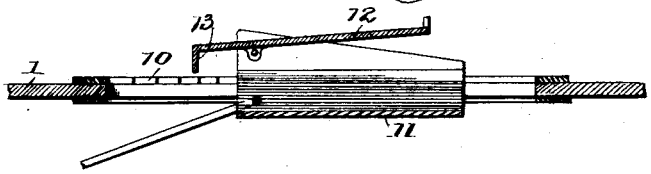
Witnesses
J. W. Reynolds
Chas. B. Hyer
Inventor
Benjamin F. Pascoe.
By John Wedderburn
Attorney

UNITED STATES PATENT OFFICE.

BENJAMIN F. PASCOE, OF GLOBE, ARIZONA TERRITORY.

WAGON-BRAKE.

SPECIFICATION forming part of Letters Patent No. 525,618, dated September 4, 1894.

Application filed March 7, 1894. Serial No. 502,709. (No model.)

*To all whom it may concern:*

Be it known that I, BENJAMIN F. PASCOE, a citizen of the United States, and a resident of Globe, in the county of Gila and Territory of Arizona, have invented certain new and useful Improvements in Buggy-Brakes; and I do hereby declare the following to be a full, clear, and exact description of the invention, such as will enable others skilled in the art to which it appertains to make and use the same.

This invention relates to buggy brakes, and has for its object to secure greater power and easier and safer working of the parts, and wherein the clutch can be thrown into a ratchet, at any time, to relieve the driver's limb from tiresome pressure, and holding the buggy or wagon from running onto the team while standing.

A further object is to render the device in such shape as to cause the foot of the driver to always remain in an easy and natural position.

A further object of the invention is to have the brake in its operation pulled directly from the center of the axle, against the wheel, to relieve the springs of all strain and make the set easier on the vehicle, and also to arrange the several parts in such manner as to add to the neat appearance and durability of buggies.

With these and other objects in view the invention consists of the construction and arrangement of the several parts, which will be more fully hereinafter described and claimed.

In the drawings:—Figure 1 is a bottom plan view of a vehicle showing the improved brake mechanism applied thereto. Fig. 2 is a detail perspective view of the foot operating mechanism in connection with the brake devices. Fig. 3 is a central longitudinal section of the device represented by Fig. 2.

Similar numerals of reference are employed to indicate corresponding parts in the several figures.

Referring to the drawings, the numeral 1 designates the body of the vehicle, which may be either a buggy or wagon of any preferred form, having an axle 2 to which the brake shoes are applied, and having attached thereto a reach 3 which is used as the pivotal support of a lever 4. Instead of the said reach, other devices may be employed for the same purpose, but the construction set forth is preferable. The lever 4 which gives the power, is placed in front of and parallel with the rear axle, and is put into a reach which is attached directly to the center of the buggy axle, as fully shown, the long end of the said lever extending outward toward one side of the body, while the shorter end is adjacent to the said reach, and has secured thereto a rod 5 movably attached to a brake bar 6, carrying brake shoes 7. To the opposite ends of the lever 4 is movably secured a long rod 8 and has its front end attached to a slide 9.

A ratchet 10 is mounted on the floor of the buggy or upon the outside of the wagon bed, which is constructed as shown and has mounted therein the slide 9, which is provided with a guide 11 extending through the ratchet to which the long rod 8 is connected. In addition, this part of the mechanism is also provided with a foot rest 12 having a clutch end 13 at the rear, the said clutch end being thrown into the ratchet by pressing downwardly on the foot rest and is thrown out by reversing the said pressure.

The several parts of the device can be manufactured in sizes to suit different vehicles and placed upon the market where they can be readily obtained, by teamsters, farmers, livery men and others who may desire to use the same.

It is obviously apparent that many minor changes in the construction and arrangement of the several parts, might be made and substituted for those shown and described, without in the least departing from the nature or spirit of the invention.

The advantages in addition to those mentioned, of the device will become readily apparent to those using the same, and in view of the easy and ready manner in which the invention can be applied, the device will form a valuable acquisition to the art.

Having thus described the invention, what is claimed as new is—

In combination with a buggy, wagon, or other vehicle of a brake mechanism comprising a lever, brake and sliding rod secured to said lever, a ratchet plate located over a slot in the buggy, wagon, or other vehicle, a slide mounted in the said slot and engaging the ratchet plate, and having a guide, and a pivoted foot-rest with a depending end adapted to engage the said ratchet teeth and pivotally mounted in the said guide portion of the slide, substantially as and for the purposes specified.

In testimony whereof I have signed this specification in the presence of two subscribing witnesses.

BENJAMIN F. PASCOE.

Witnesses:
GEORGE E. SHUTE,
H. M. SCHLOIRJK.